Dec. 17, 1935.  E. F. DILLEY  2,024,913
DETACHABLE POURING SPOUT
Filed July 17, 1935
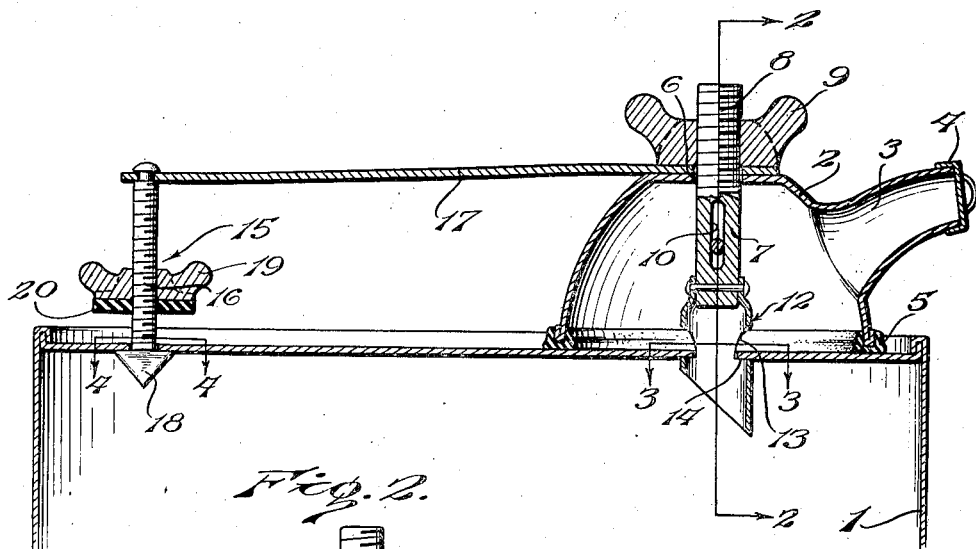
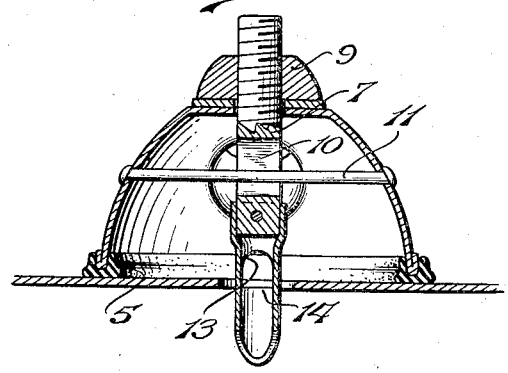
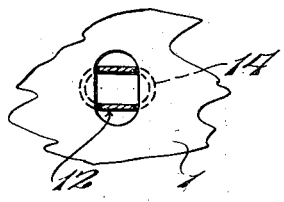
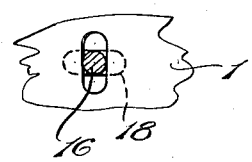
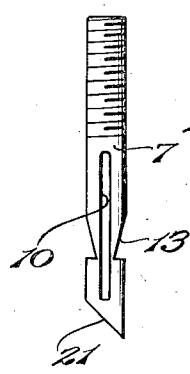
Edward F. Dilley
INVENTOR
BY Victor J. Evans & Co.
ATTORNEY
WITNESS Carman Patented Dec. 17, 1935

2,024,913

UNITED STATES PATENT OFFICE 2,024,913

DETACHABLE POURING SPOUT

Edward F. Dilley, Williamsport, Ind.

Application July 17, 1935, Serial No. 31,906

3 Claims. (Cl. 221—23)

This invention relates to detachable pouring spouts for sealed containers, and has for the primary object the provision of a device of this character which is easy to apply and at the same time forms in the container a port so that the liquid content thereof may enter the device when the container is tilted for passage through said device in a controlled or restricted flow to permit dispensing of the liquid content without danger of spilling.

Another object of this invention is the provision of means whereby the device may be secured to the container with a liquid seal to prevent evaporation of the liquid content of the container when the latter has been once opened and not emptied.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary vertical sectional view showing a detachable pouring spout adapted to a container and constructed in accordance with my invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a detail sectional view showing a modified form of my invention.

Referring in detail to the drawing, the numeral 1 indicates a conventional type of sealed container employed for sealing liquids to prevent inferior liquids from being sold in lieu of a requested brand and quality of liquid. A container of this kind is minus any means of pouring or dispensing its contents and if opened in the ordinary manner it is difficult to dispense the liquid without danger of spilling or wasting. To equip a container of this kind with a permanent dispensing medium would, besides materially increasing its cost, render handling of the container and the packing of the container with others difficult. Therefore, with the use of my invention a container of the character described can be readily opened and the content poured therefrom without danger of spilling and which will also act as an effective seal or closure for the container when once opened whereby any liquid left in the container will be protected against evaporation or contamination by foreign matter.

My invention is hereinafter described in detail and consists of an inverted substantially dome-shaped member 2 forming a receptacle to receive the content of the container when the latter has been opened by my invention and tilted and has formed integrally with one side thereof a pouring spout 3 closed by a removable cap 4. The edges of the member 2 are equipped with a gasket 5 to contact the top or a wall of the container 1, as shown in Figure 1. The member 2 has an opening 6 through which extends a stem 7, a portion of which is screw threaded, as shown at 8, and projects outwardly of the member 2 and has threaded thereon a wing nut 9. A slot 10 is formed in the stem through which a guide pin 11 extends. The pin 11 is suitably secured to opposite walls of the member 2. Secured to the inner end of the stem 7 is a cutter 12 which is of hollow formation and of elliptical shape in cross section and has its free end cut on an angle and sharpened so that when brought in contact with the container with force it will readily penetrate the container. Notches 13 are provided in opposite sides of the cutter 12 between its cutting end and the attached end for the purpose of receiving opposite walls of the opening formed in the container by turning the cutter through rotation of the stem 7 after the penetration of the container by the cutter. The shoulders 14 of the cutter defined by the notches 13 underlie the inner face of the punctured wall of the container preventing withdrawal of the cutter from the container. By turning the wing nut tightly down against the member 2, the latter or gasket 5 thereof is forced tightly against the wall of the container about the punctured opening in the container and with the pouring spout 3 closed by the cap 4 the container is sealed to prevent evaporation of the content. The content can be readily dispensed by tilting the container with the cap 4 removed from the spout 3 in a controlled flow.

Suitably secured to the stem 7 or to some other part of the device described is a vent opening forming device 15 consisting of a screw threaded stem 16, in this instance connected to the stem 7 by a strip 17. However, some other means may be provided for the connection between the stem 15 and the stem 7. The stem 16 terminates at one end in an arrow head shape to form a penetrating portion 18. A wing nut 19 is threaded on the stem 16 and carries a gasket 20. After the application of the pouring device to the container, the end 18 of the stem 16 is forced through the container and the wing nut turned to bring the gasket tightly against the wall of the container to close the opening formed by the penetrating end 18 of the stem. When dispensing liquid from the container the wing nut 19 is backed away from the container to permit the interior of the container to be vented through the opening formed by the penetrating end 18. It is to be understood that after the penetrating end 18 is passed through the wall of the container it is positioned so as to underlie or engage with the inner face of the wall, as shown in Figure 1, to prevent accidental withdrawal of the stem 16 from the container.

From the foregoing description taken in connection with the accompanying drawing, it will be seen that a device has been provided which is compact, simple, and easily applied to a container for the purpose of forming therein openings, one of which to admit the liquid content of the container to and through the pouring spout of the device during tilting of the container and the other to admit atmospheric pressure to the interior of the container during the dispensing of its content. Further, it will be noted that the device will effectively close the container when once opened to prevent evaporation and contamination of the content.

Referring to my modified form of invention, as shown in Figure 5, the stem 7 may have one end shaped to form a cutter 21 in lieu of employing a separable cutter 12. The stem 7 in this instance is equipped with the notches 13 and the slot 10 thereof extends through the end of the stem having the cutter 21 so that the liquid content of the container may pass through the slot 10 into the member 2 during the tilting of the container instead of through the notches 13 of the cutter 12.

Having described the invention, I claim:

1. A detachable pouring spout and closure for sealed containers comprising a closure member to engage a container, a pouring spout for said member, a removable cap for said pouring spout, a stem slidably connected to said closure member and extending exteriorly thereof and screw threaded, a combined cutting and anchoring medium carried by said stem to form an opening in the container and to secure said stem to the container in a given position, a gasket carried by said closure member to contact the container, an attaching medium connected to the stem, a second stem connected to the attaching medium and having one end shaped to form a penetrating point to pass through the container to form a vent opening, and means movably mounted on the second stem for closing the vent opening.

2. A detachable pouring spout and closure for sealed containers comprising a closure member to engage a container, a pouring spout for said member, a removable cap for said pouring spout, a stem slidably connected to said closure member and extending exteriorly thereof and screw threaded, a combined cutting and anchoring medium carried by said stem to form an opening in the container and to secure said stem to the container when in a given position, a gasket carried by said closure member to contact the container, an attaching medium connected to the stem, a second stem connected to the attaching medium and having one end shaped to form a penetrating point to pass through the container to form a vent opening, a nut threaded to the second stem, a gasket carried by the second-named nut to contact the container about the vent opening for closing the latter.

3. A detachable pouring spout and closure for sealed containers comprising a closure member, a stem adjustably secured to the closure member, means for adjusting said stem, a cutter carried by said stem and including a hollow portion opening outwardly through one end thereof and having said end cut away to provide a cutting portion, said hollow portion between the stem and the cutting portion being notched to provide ports and shoulders.

EDWARD F. DILLEY.